United States Patent [19]
Maeda et al.

[11] Patent Number: 5,720,375
[45] Date of Patent: Feb. 24, 1998

[54] COUPLING DEVICE FOR USE IN DIFFERENTIAL GEAR DEVICES

[75] Inventors: Hiroaki Maeda, Toyota; Yuki Tojima, Aichi Pref., both of Japan

[73] Assignee: Aisin Seiki Kabushiki Kaisha, Kariya, Japan

[21] Appl. No.: 623,835

[22] Filed: Mar. 29, 1996

[30] Foreign Application Priority Data

Mar. 31, 1995 [JP] Japan .................. 7-075842

[51] Int. Cl.⁶ .......................... F16D 27/115; F16H 48/22
[52] U.S. Cl. .................... 192/35; 192/48.2; 192/54.52
[58] Field of Search ...................... 192/35, 48.2, 54.5, 192/54.52, 70.23, 93 A; 180/249

[56] References Cited

U.S. PATENT DOCUMENTS

| | | | |
|---|---|---|---|
| 2,933,171 | 4/1960 | Kraeplin | 192/35 X |
| 4,781,078 | 11/1988 | Blessing et al. | |
| 5,059,160 | 10/1991 | Raniero | 192/93 A X |
| 5,083,986 | 1/1992 | Teraoka et al. | 192/35 X |
| 5,366,419 | 11/1994 | Oda | 192/35 X |
| 5,398,792 | 3/1995 | Teraoka | 192/48.2 |
| 5,464,084 | 11/1995 | Aoki et al. | 192/35 |

FOREIGN PATENT DOCUMENTS

| | | |
|---|---|---|
| 63-195449 | 8/1988 | Japan . |
| 1-182629 | 7/1989 | Japan . |
| 2-89822 | 3/1990 | Japan . |
| 3-219123 | 9/1991 | Japan . |
| 4-18747 | 2/1992 | Japan . |
| 5-12767 | 2/1993 | Japan . |

*Primary Examiner*—Richard M. Lorence
*Attorney, Agent, or Firm*—Burns, Doane, Swecker & Mathis, LLP

[57] ABSTRACT

A coupling device includes an input member, an output shaft coaxial with the input member, and a clutch mechanism that includes a plate disposed at the side of the input member and a disc disposed at the side of the output shaft. The clutch mechanism transmits rotational torque of the input member by frictional engagement between the plate and the disc. A disc supporting member is disposed between the clutch mechanism and the output shaft, and supports the disc. An actuator is adapted to engage the plate with the disc, and a transforming device moves the disc supporting member so as to engage the disc with the plate when the rotational torque of the disc supporting member differs from the rotational torque of the output shaft.

18 Claims, 9 Drawing Sheets

5,720,375

COUPLING DEVICE FOR USE IN DIFFERENTIAL GEAR DEVICES

FIELD OF THE INVENTION

The present invention relates to a coupling device and more particularly to a coupling device adapted to be used in differential gear devices including limited slip differential gear devices.

BACKGROUND OF THE INVENTION

A conventional coupling device for use in limited slip differential gear devices is disclosed in Japanese Patent Application hid-Open Publication No. 3(1991)-219123. FIG. 9 illustrates the coupling device shown in this publication.

The coupling device includes a pilot clutch 1 which is coupled by an actuator 2, a cam arrangement 3 which is operated by the coupling of the pilot clutch 1, a pressing member 4 moved by the cam arrangement 3 and a main clutch 5 which is coupled by the pressing member 4. According to this coupling device, torque is transmitted from the device side to the drive side.

However, since the coupling device includes, in addition to the main clutch 5, the pilot clutch 1 which generates a pressing force for coupling the main clutch 5, the size of the coupling device is increased as is the cost associated with manufacturing the coupling device. Further, in the prior art coupling device shown in FIG. 9, torque is required for generating the pressing force only when the pilot clutch is coupled and a part of the transmission torque is used as this torque. This means that the torque is not efficiently transmitted from the drive side to the driven side and so a loss is generated.

SUMMARY OF THE INVENTION

It would be desirable, therefore, to provide a coupling device which overcomes at least the aforementioned disadvantages and drawbacks. Further, a need exists for a coupling device which can be reduced in size and which can be manufactured at a reduced cost.

In light of the foregoing, one aspect of the invention involves the provision of a coupling device that includes an input member, an output shaft coaxially disposed with the input member, and a clutch mechanism that includes a plate disposed at the side of the input member and a disc disposed at the side of the output shaft. The clutch mechanism transmits rotational torque of the input member by frictional engagement between the plate and the disc. A disc supporting member is disposed between the clutch mechanism and the output shaft, and supports the disc. An actuator engages the plate with the disc, and a transforming arrangement moves the disc supporting member to engage the disc with the plate when the rotational torque of the disc supporting member differs from that of the output shaft.

According to another aspect of the invention, a coupling device for use in a differential gear device includes an input member, an output member coaxially disposed with respect to said input member, and a clutch mechanism interposed between the input member and the output member for transmitting rotational torque of the input member through frictional engagement of the plates with the discs. The clutch mechanism includes a plurality of plates operatively associated with the input member and a plurality of discs operatively associated with the output member. An actuator is operatively associated with the clutch mechanism for effecting frictional engagement between the plates and the discs. A cam mechanism is disposed between the clutch mechanism and the output member to urge the discs into frictional engagement with the plates when the rotational torque of the input member differs from the rotational torque of the output member.

BRIEF DESCRIPTION OF THE DRAWING FIGURES

Additional and further features of the present invention will become more apparent from the following detailed description of preferred embodiments considered with reference to the accompanying drawing figures in which like elements bear like reference numerals and wherein.

DETAILED DESCRIPTION OF THE PREFERRED EMBODIMENTS

Figure 1:
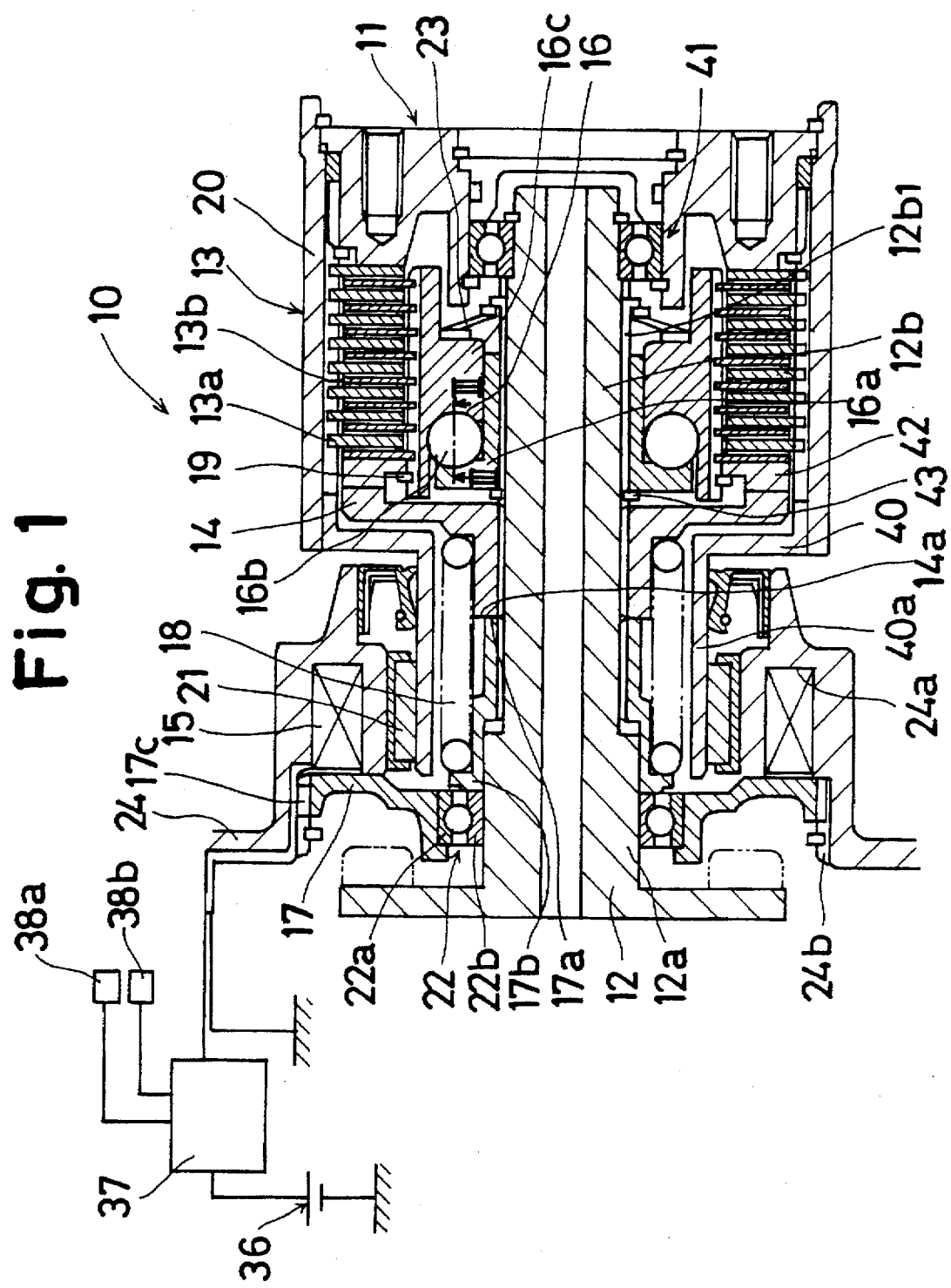
FIG. 1 is a cross-section view of a coupling device according to a first embodiment of the present invention.
Figure 2:
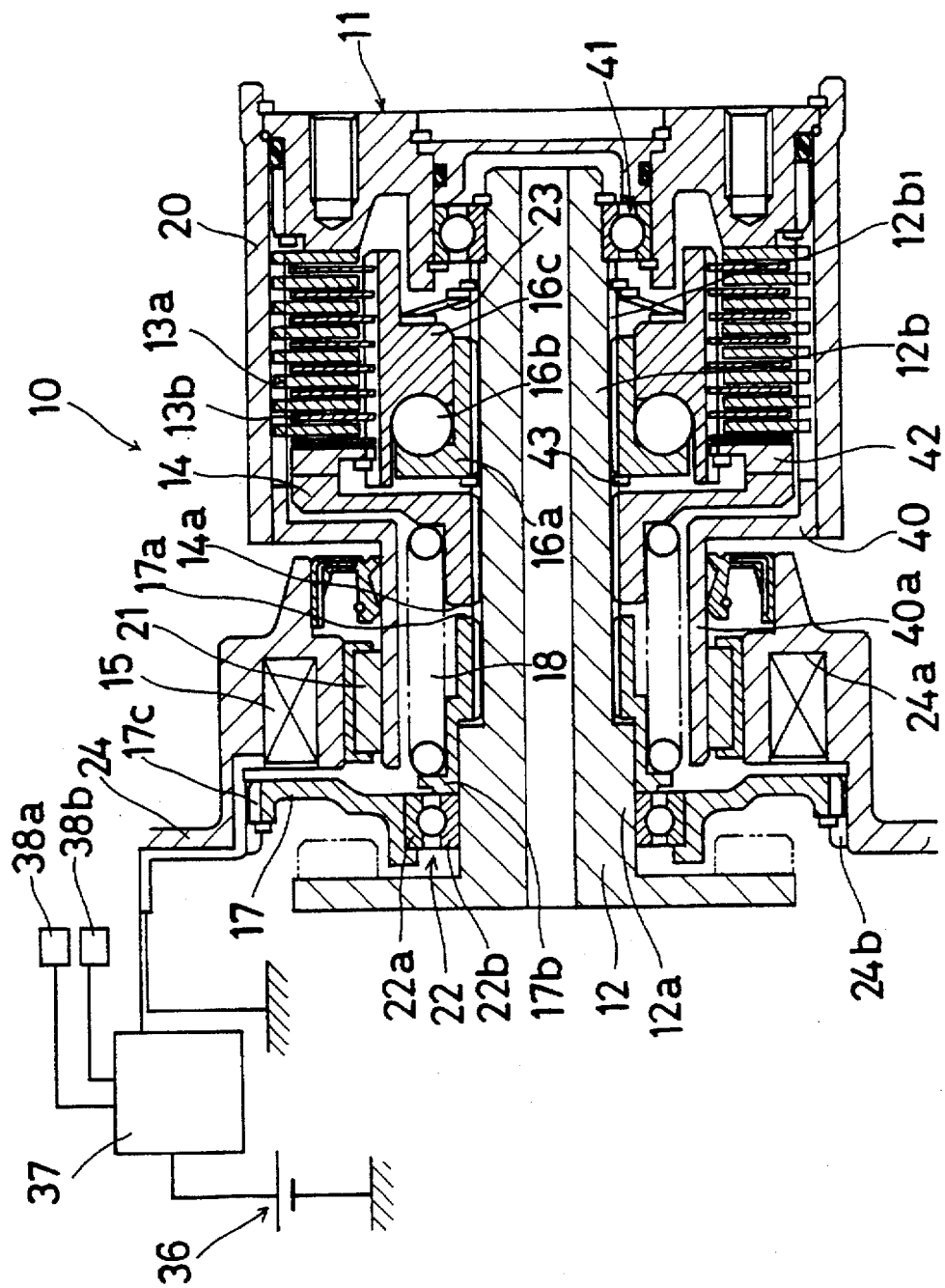
FIG. 2 is a cross-sectional view of the coupling device shown in FIG. 1 illustrating another operational condition of the device.
Figure 3:
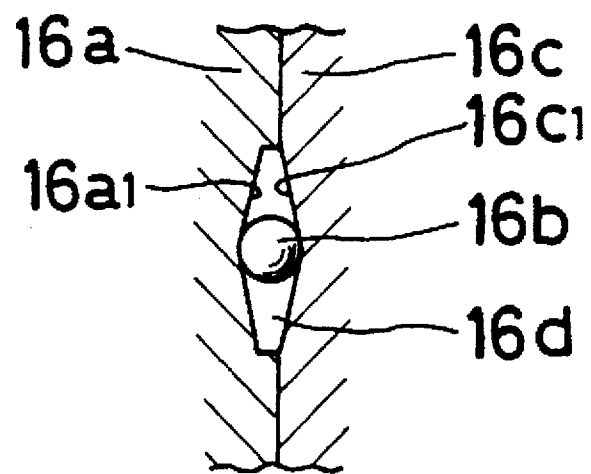
FIG. 3 is a cross-sectional view of a portion of the device shown in FIG. 1 taken along the section line III—III in FIG. 1.

Referring initially to FIGS. 1–3 which depict a first embodiment of the present invention, a coupling device 10 is disposed between a propeller-shaft (not shown) and a rear-differential gear device (not shown) of a four wheel drive vehicle. When the difference in revolutions between the front wheel and the rear wheel becomes large, the coupling device 10 is operated by an actuator to approach a direct coupling four wheel driving condition. Further, when the steering angle exceeds a fixed angle, the coupling device 10 operates to approach a two wheel driving condition. Thus, the so called tight corner braking-phenomenon is prevented from occurring.

As shown in FIG. 1, the coupling device 10 includes an input member 11, an output shaft 12 that is coaxially disposed with respect to the input member 11, and a clutch mechanism 13. The clutch mechanism is constituted by a plurality of plates 13a operatively associated with and disposed at the side of the input member 11, and a plurality of discs 13b operatively associated with and disposed at the side of the output shaft 12. The clutch mechanism transmits the rotational torque of the input member 11 as a result of engagement between the plurality of plates 13a and the plurality of discs 13b. The discs 13b are supported on a disc supporting member 16c which is disposed between the discs 13b and the output shaft 12. A pressing member 14 presses the plurality of discs 13b against the plurality of plates 13a, and a solenoid coil 15 moves the pressing member 14 so that the clutch mechanism 13 is connected to the disc supporting member 16c. A cam arrangement or cam means 16 moves the disc supporting member 16c in the axial direction so that the plurality of discs 13b and the plurality of plates 13a engage each other when the rotational torque of the disc supporting member 16c differs from that of the output shaft 12. The cam arrangement or cam means 16 constitutes a transforming means of the present invention as will be understood from the description below.

The clutch mechanism 13 includes eight ring-shaped plates 13a and eight ring-shaped discs 13b that alternate with one another. The outer circumferential portion of each of the plates 13a is splined and the inner circumferential portion of a cylindrical housing 20 is correspondingly splined. The outer circumferential portion of each of the plates 13a engages the inner circumferential portion of the housing 20 via the splines. Thus, each of the plates 13a is supported in the housing 20 to be axially movable and to rotate with the housing 20 as a unitary body.

On the other hand, the inner circumferential portion of each of the discs 13b is splined and the outer circumferential portion of the disc supporting member 16c is correspondingly splined. The inner circumferential portion of each of the discs 13b engages the outer circumferential portion of the disc supporting member 16c via the splines. Thus, each of the discs 13b is supported on the disc supporting member 16c to be axially movable and to be rotated with the disc supporting member 16c as a unitary body.

The plates 13a are located relative to the interspersed discs 13b so that one side surface of each of the plates 13a opposes a side surface of one of the discs 13b. In this way, the clutch mechanism 13 is connected when the disc supporting member 16c is moved so that one side surface of each of the discs 13b contacts the opposing side surface of each of the plates 13a. A paper friction material can be adhered to one side surface of the discs 13b.

The input member 11 which is connected to the propeller-shaft (not shown) is fixed to one end of the housing 20 so that the housing 20 is rotated with the input member 11 as a unitary body. A sleeve 40 is fixed to the other end of the housing 20. The sleeve 40 is provided with a projecting portion 40a which projects outwards from the housing 20 in the axial direction.

A cylindrical case 24 is rotatably supported on the outer circumferential portion of the projection portion 40a via a roller-bearing 21. The case 24 is provided with a circular groove 24a which extends in the axial direction and splines 24b which are located radially outwardly of the groove 24a. The case 24 is fixed to the body (not shown) of the vehicle.

The output shaft 12 which is connected to the rear-differential gear device (not shown) has a stepped-shape housing defined by a large-diameter portion 12a and a small-diameter portion 12b. The output shaft 12 is located inside or radially inwardly of the projecting portion 40a, the disc supporting member 16c and the input member 11. One end of the small-diameter portion 12b is rotatably supported in the inner bore of the input member 11 via a ball-bearing 41. An inner race 22b of a ball-bearing 22 is fitted on the large-diameter portion of the output shaft 12 so as to be movable in the axial direction and an outer race 22a of the ball-bearing 22 is fixed to a first movable member 17 which is made of magnetic material. The first movable member 17 has a ring-shape and possesses splines 17c which engage the splines 24b of the case 24 and which are formed on the outer circumferential portion of the first movable member 17. The first movable member 17 is axially movable relative to the output shaft 12, but is not movable in the circumferential direction.

The outer circumference of the small-diameter portion 12b of the output shaft 12 is provided with splines 12b1. A cylindrical second movable member 17b having splines which engage the splines 12b1 of the output shaft 12 is fitted on the small-diameter portion 12b. The second movable member 17b is provided with a projecting portion which extends towards the ball-bearing 22 and which is able to contact the ball-bearing 22. The cylindrical pressing member 14 has splines which engage the splines 12b1 of the output shaft 12. The pressing member 14 is fitted on the small-diameter portion 12b so as to be adjacent to the second movable member 17b. The pressing member 14 is provided with a flange portion at its one end and the other end 14a of the pressing member 14 is able to contact the end portion 17a of the second movable member 17b. A projecting portion which extends towards the discs 13b is formed on the outer circumferential portion of the flange portion of the pressing member 14.

In this embodiment, a ring plate 42 is disposed on the disc supporting member 16c so as to be located between the projecting portion of the pressing member 14 and the discs 13b. The ring plate 42 is provided with splines which engage the splines of the disc supporting member 16c. A snap ring 19 is fixed on the outer circumferential portion of the disc supporting member 16c to prevent the ring plate from axially moving toward the pressing member 14.

A coil spring 18 is disposed between a flange portion formed on the end of the projecting portion of the second movable member 17b and a base portion of the flange portion of the pressing member 14. Thus, the projecting portion of the second movable member 17b contacts the ball-bearing 22 and is urged leftward together with the ball-bearing 22 and the first movable member 17. The pressing member 14 is urged rightward by the coil spring 18 and the flange portion of the pressing member 14 contacts the ring plate 42.

A solenoid coil 15 is wound in the groove 24a of the case 24. The solenoid coil 15 is electrically connected to a battery 36 via a control device 37. The control device 37 controls the supply of electric current from the battery to the solenoid coil 15 in accordance with the driving condition of the vehicle. The first movable member 17 is located opposite to the solenoid coil 15 in the axial direction. Thus, a magnetic circuit is formed by the case 24 and the first movable member 17 around the solenoid coil 15. Accordingly, when electric current is supplied to the solenoid coil 15 by the control device 37, magnetic flux is generated around the solenoid coil 15 and an attracting force resulting from the magnetic flux acts on the first movable member 17. Consequently, the first movable member 17 and the second movable member 17b are moved rightward while compressing the coil spring 18 and the end 17a of the second movable member 17b contacts the end 14a of the pressing member 14 as shown in FIG. 1. Thereafter, the pressing member 14 is moved rightward and presses the discs 13b via the ring plate 42 so that the discs 13b are frictionally engaged with the plates 13a in a strong manner. When electric current is not supplied to the solenoid coil 15 by the control device 37, the first and second movable members 17, 17b are urged leftward so that the second movable member 17b is separated from the pressing member 14 as shown in FIG. 2. Therefore, the initial urging force of the coil spring 18 acts on the pressing member 14 and the pressing member 14 presses the discs 13b via the ring plate 42 so that the discs 13b are frictionally engaged with the plates 13a.

As seen with reference to FIG. 3 which is a cross-sectional view taken along line III—III in FIG. 1, the cam arrangement 16 includes a cylindrical cam ring 16a, the disc supporting member 16c and a plurality of ball members 16b. The cam ring 16a is provided with a plurality of grooves 16a1 and splines. The splines are formed on the inner circumferential portion of an inner bore of the cam ring 16a and engage the splines 12b1 of the output shaft 12 so that the cam ring 16a can move axially relative to the output shaft 12, but cannot rotate relative to the output shaft 12. The cam ring 16a is prevented from moving leftward by a snap ring 43 which is fixed to the output shaft 12. The grooves 16a1 are formed on one end surface of the cam ring 16a at regular intervals so as to extend in the circumferential direction.

As shown in FIG. 3, the center portion of each groove 16a1 is deeper than the depth at both ends of the groove so that the depth of the grooves 16a1 deepens gradually from both ends toward the center portion. A plurality of grooves 16c1 equal in number to the number of grooves 16a1 are formed on one end surface of the disc supporting member 16c. These grooves 16c1 have substantially the same shape as the grooves 16a1. The disc supporting member 16c is located relative to the cam ring 16a so that the grooves 16a1 and the grooves 16c1 oppose one another. Thus, wedge spaces 16d which each posses a wedge-shape are formed between the grooves 16a1 and the grooves 16c1. A ball member 16b whose diameter is substantially equal to the distance between the center portion of the grooves 16a1 and the center portion of the grooves 16c1 is disposed in each of the wedge spaces 16d.

The other end surface of the disc supporting member 16c is engaged by one end of a cone spring 23. The other end of the cone spring 23 engages a snap ring which is fixed to the output shaft 12. Thus, the disc supporting member 16c is always urged leftward by the cone spring 23 so that the ball members 16b are always nipped between the grooves 16a1, 16c1. Accordingly, when the disc supporting member 16c is rotated relative to the cam ring 16a, the disc supporting member 16c is moved rightward by a cam function which is obtained by each of the ball members 16b and each pair of grooves 16a1, 16c1. Namely, the rotational movement of the disc supporting member 16c is transformed into axial movement of the disc supporting member 16c. When the disc supporting member 16c is moved rightward, the discs 13b are pressed on the plates 13a by virtue of the snap ring 19.

In this embodiment, the cam means 16 is applied as a transforming means, and the amount of wear which is generated when the rotation of the clutch mechanism 13 and the disc supporting member 16c is transformed into axial movement of the disc supporting member 16c is decreased. Further, the amount of axial movement of the disc supporting member 16c does not change in accordance with wear.

The above described first embodiment of the coupling device 10 operates as follows.

Electric current is not supplied to the solenoid coil 15 when the vehicle drives straight and the rotational speed of the input member 11 is almost the same as that of the output shaft 12. The rotational speed of the front wheel is the same as that of the rear wheel. The rotational speeds of the front and rear wheels are detected by speed sensors 38a, 38b, and the detected signals are fed to the control device 37.

In this condition shown in FIG. 2, since the discs 13b are engaged with the plates 13a by the initial urging force of the coil spring 18 and since torque is transmitted from the input member 11 to the output member 12 in accordance with the engagement due to the initial urging force, the behavior of the vehicle is stabilized against sudden side wind.

When the front wheel slips, and the speed sensors 38a, 38b and the control device 37 detect that the difference between rotational speeds of the front and rear wheels is more than a predetermined value, electric current is supplied to the solenoid coil 15 by the control device 37. The first movable member 17 is thus attracted by the coil 15 and the first movable member 17 is moved toward the solenoid coil 15. Accordingly, the coil spring 18 is compressed by the second movable member 17b and therefore the urging force causes the pressing member 14 to press the discs 13b via the ring plate 42 in proportion to the mount of compression of the coil spring 18. When the electric current supplied to the solenoid coil 15 is larger than a predetermined value, the end 17a of the second movable member 17b contacts the end 14a of the pressing member 14. The pressing member 14 thus presses the discs 13b via the ring plate 42 by the attracting force between the first movable member 17 and the solenoid coil 15 and this force is transmitted directly to the pressing member 14 as depicted in FIG. 1. The discs 13b are then frictionally engaged with the plates 13a and the clutch mechanism 13 is connected so that the torque of the input member 11 is transmitted to the disc supporting member 16c via the friction force between the discs 13b and plates 13a.

When the disc supporting member 16c rotates relative to the cam ring 16a, the disc supporting member 16c is moved rightward by the above mentioned cam friction. As a result, the ring plate 42 is moved together with the disc supporting member 16c and the discs 13b are further pressed on the plates 13a. Accordingly, the discs 13b are frictionally engaged with the plates 13a more strongly and large torque is transmitted from the input member 11 to the disc supporting member 16c by the clutch mechanism 13. The large torque which is transmitted to the disc supporting member 16c is transmitted to the cam ring 16a via the ball members 16b. The urging force that the plates 13a apply to the discs 13b is proportional to the difference in rotational torque of the disc supporting member 16c and the output shaft 12. As mentioned above, sufficient engaging force of the clutch mechanism 13 for transmitting the large torque is obtained even if the electric current flowing in the solenoid coil 15 is small.

FIG. 4 to FIG. 8 shows other embodiments of the present invention. In FIG. 4 to FIG. 8, the parts corresponding to those shown in FIG. 1 are identified by the same reference numbers.

Figure 4:
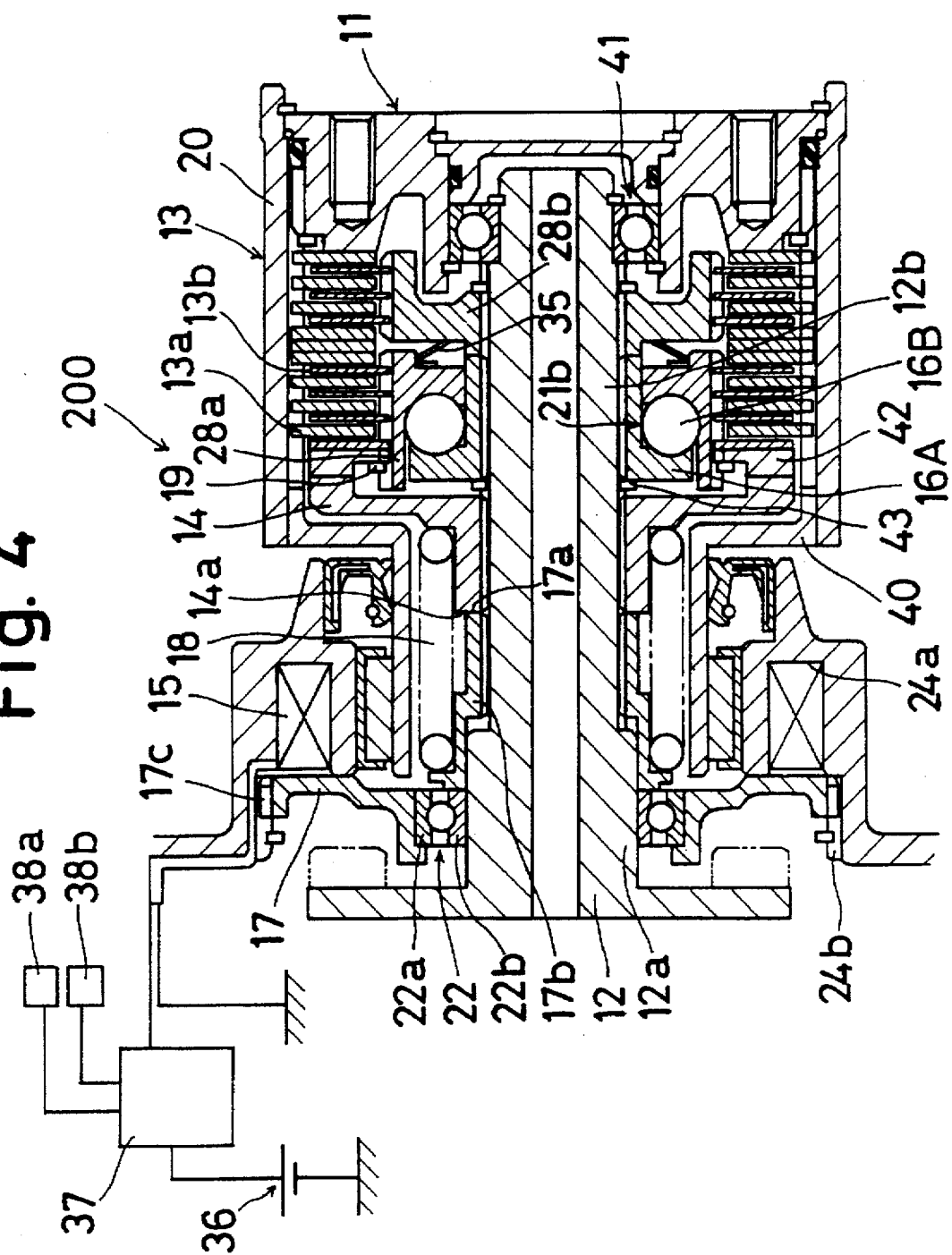
FIG. 4 is a cross-sectional view of a coupling device according to a second embodiment of the present invention.

FIG. 4 shows a coupling device 200 of a second embodiment of this invention. In the second embodiment, the disc supporting member is separated into a first disc supporting member 28a and a second disc supporting member 28b. A cone spring 35 is disposed between the first disc supporting member 28a and the second disc supporting member 28b. A plurality (four) of discs 13b are supported on the first disc supporting member 28a as in the first embodiment and a cam means 21b is constituted by the first disc supporting member 28a, a cam ring 16A and ball members 16B. The construction of the cam means 21b is substantially the same as that of the cam means in the first embodiment.

The second disc supporting member 28b is provided with the first splines and second splines. The first splines engage the splines of three discs 13b so that these discs 13b are axially movable relative to the disc supporting member 28b and are rotated with the disc supporting member 28b as a unitary body. The second splines engage the splines 12b1 of the output shaft 12 so that the disc supporting member 28b is rotated with the output shaft 12 as a unitary body. The second supporting member 28b is prevented from moving rightwardly by a snap ring fixed to the output shaft 12 and is prevented from moving leftwardly by the cam ring 16A. The cone spring 35 functions in a manner similar to the cone spring 23 of the first embodiment.

In this embodiment, two transmitting paths from the input member 11 to the output shaft 12 are formed and so it is possible to simply the control of the torque value of the output shaft 12 with respect to the torque of the input member 11.

Figure 5:
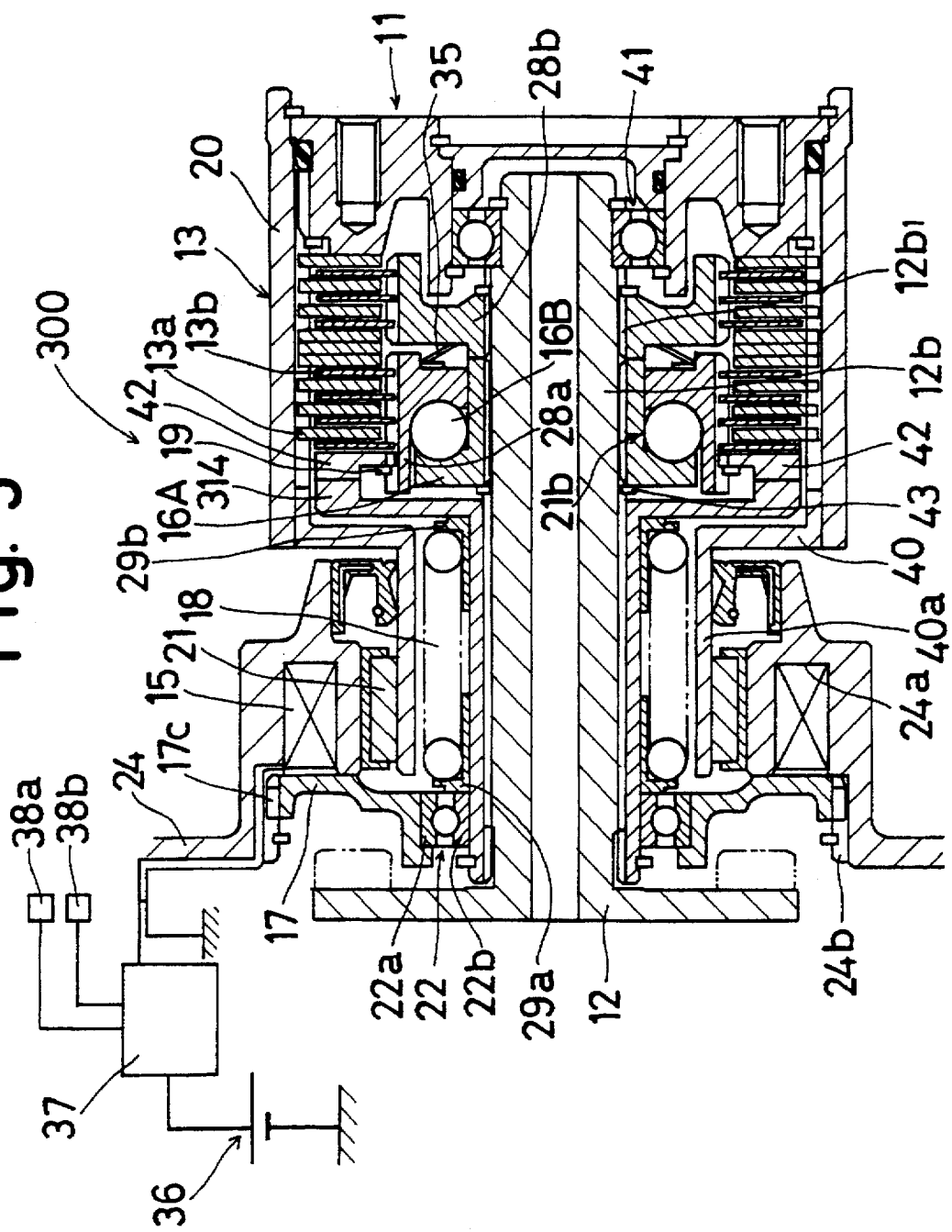
FIG. 5 is a cross-sectional view of a coupling device according to a third embodiment of the present invention.

FIG. 5 shows a coupling device 300 of a third embodiment of this invention. In FIG. 5, the parts which correspond to the parts described above with reference to the embodiment shown in FIG. 4 are identified by the same reference numbers. In this embodiment, the output shaft 12 does not possess a large-diameter portion as in the case of the first embodiment and the second movable member is not fitted on the output shaft 12. The pressing member 314 has a long tubular portion whose inner bore has splines that engage the splines 12b1 of the output shaft 12 so as to be axially movable relative to the output shaft 12. The ball-bearing 22 is slidably fitted on the outer circumferential portion of the tubular portion of the pressing member 314.

On the outer circumferential portion of the tubular portion, two tubular spring supporting members 29a, 29b are loosely fitted between the ball-bearing 22 and the base portion of the flange portion of the pressing member 314. A flange portion is formed on one end of the spring supporting member 29a which is opposite to the ball-bearing 22. A flange portion is formed on one end of the spring supporting member 29b which is opposite to the flange portion of the pressing member 314. The coil spring 18 is disposed between the flange portions of the spring supporting member 29a, 29b. The pressing member 314 is provided with the flange portion and the projecting portion which projects towards the ring plate 42 so as to be able to press the discs 13b rightward via the ring plate 42. The spring supporting members 29a, 29b do not contact each other when the coil spring 18 is most compressed.

In this embodiment, when the first movable member 17 is attracted toward the solenoid coil 15 and then the coil spring 18 is compressed, the pressing member 314 is moved only by the urging force of the coil spring 18. Therefore, it is possible to control the electric current value supplied to the solenoid coil 15 for obtaining a desired engaging force of the clutch mechanism 13. Further, is possible to absorb the wear of the clutch mechanism 13 by the urging force of the coil spring 18.

Figure 6:
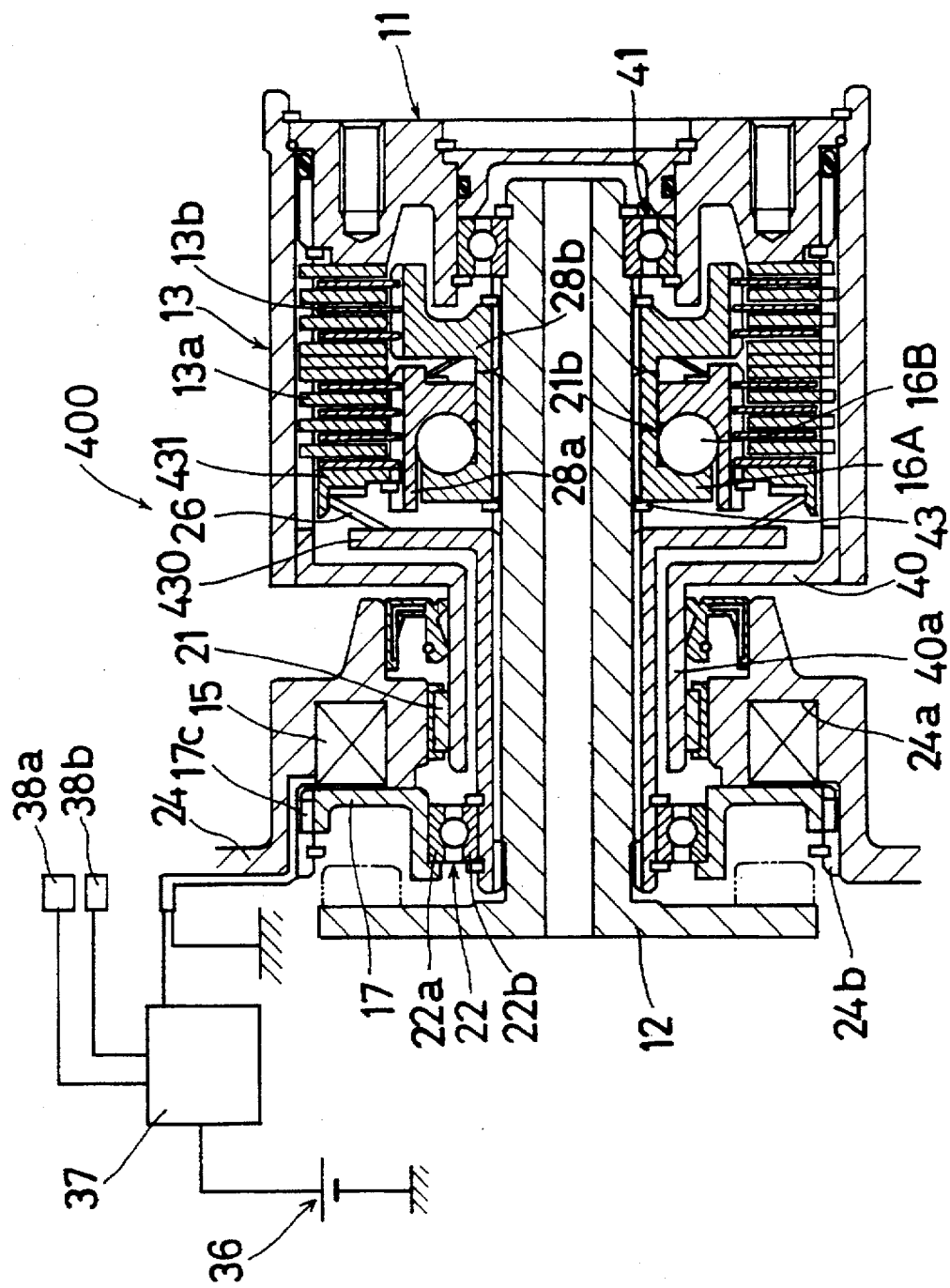
FIG. 6 is a cross-sectional view of a coupling device according to a fourth embodiment of the present invention.

FIG. 6 shows a coupling device 400 of the fourth embodiment of this invention. In FIG. 6 the parts which correspond to those shown in FIG. 5 are identified by the same reference numbers. In the fourth embodiment, the pressing member 314 and the ring plate 42 of the third embodiment are separated into a pressing member 430 and a ring plate 431. A cone spring 23 is disposed between a flange portion of the pressing member 430 and the ring plate 431. The initial urging force of the cone spring 26 acts on the ring plate 431 and the ring plate 431 presses the discs 13b so that the discs 13b are frictionally engaged with the plates 13a.

In this embodiment due to the use of the cone spring 26 instead of the coil spring 18 of the third embodiment, the diameter of the inner circumferential portion of the solenoid coil 15 can be smaller than the diameter of the inner circumferential portion of the solenoid coil 15 of the third embodiment.

Figure 7:
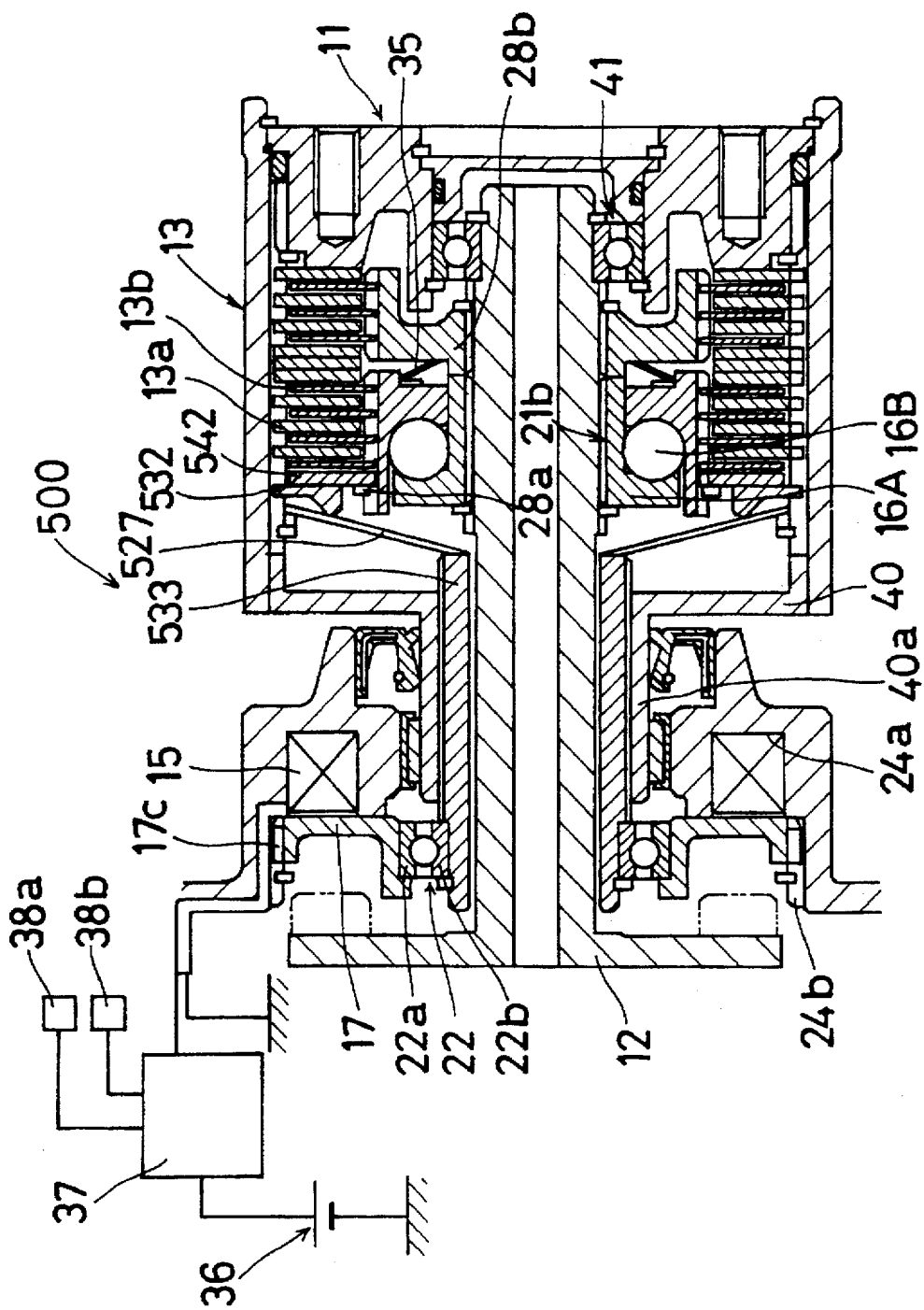
FIG. 7 is a cross-sectional view of a coupling device according to a fifth embodiment of the present invention.

FIG. 7 shows a coupling device 500 of the fifth embodiment of this invention. In FIG. 7, the same parts which correspond to those shown in FIG. 6 are identified by the same reference numbers. In the fifth embodiment, the coupling device 500 includes a lever 527 acting between a pressing member 533 and a ring pressing member 532 to transmit the urging force of the solenoid coil 15. The ring pressing member 532 is disposed at the side of the input member 11 so as to be axially movable. The ring pressing member 532 urges a ring plate 542 when electric current is supplied to the solenoid coil 15 by the control device 37. The pressing member 533 is then moved rightward and presses the ring pressing member 532 via the lever 527. Thus, the ring plate 542 is pressed rightward by the ring pressing member 532 so that the discs 13b are fictionally engaged with the plates 13a in a strong manner.

In this embodiment, to change the lever ratio of the lever 527, it is possible that the urging force urging the plurality (four) of discs 13b rightward by the attracting force of the solenoid coil 15 is larger than the attracting force of the solenoid coil 15.

Figure 8:
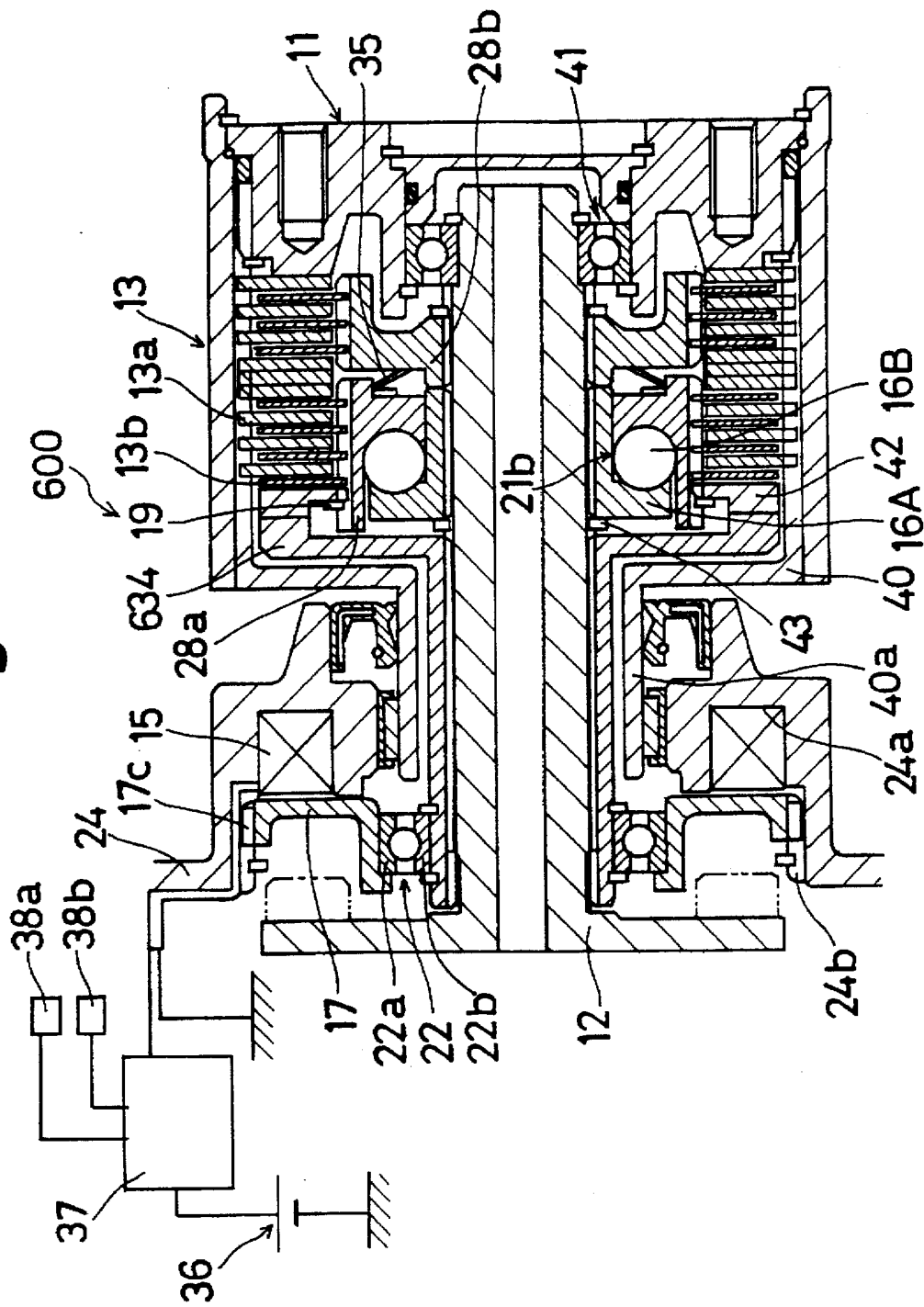
FIG. 8 is a cross-sectional view of a coupling device according to a sixth embodiment of the present invention.
Figure 9:
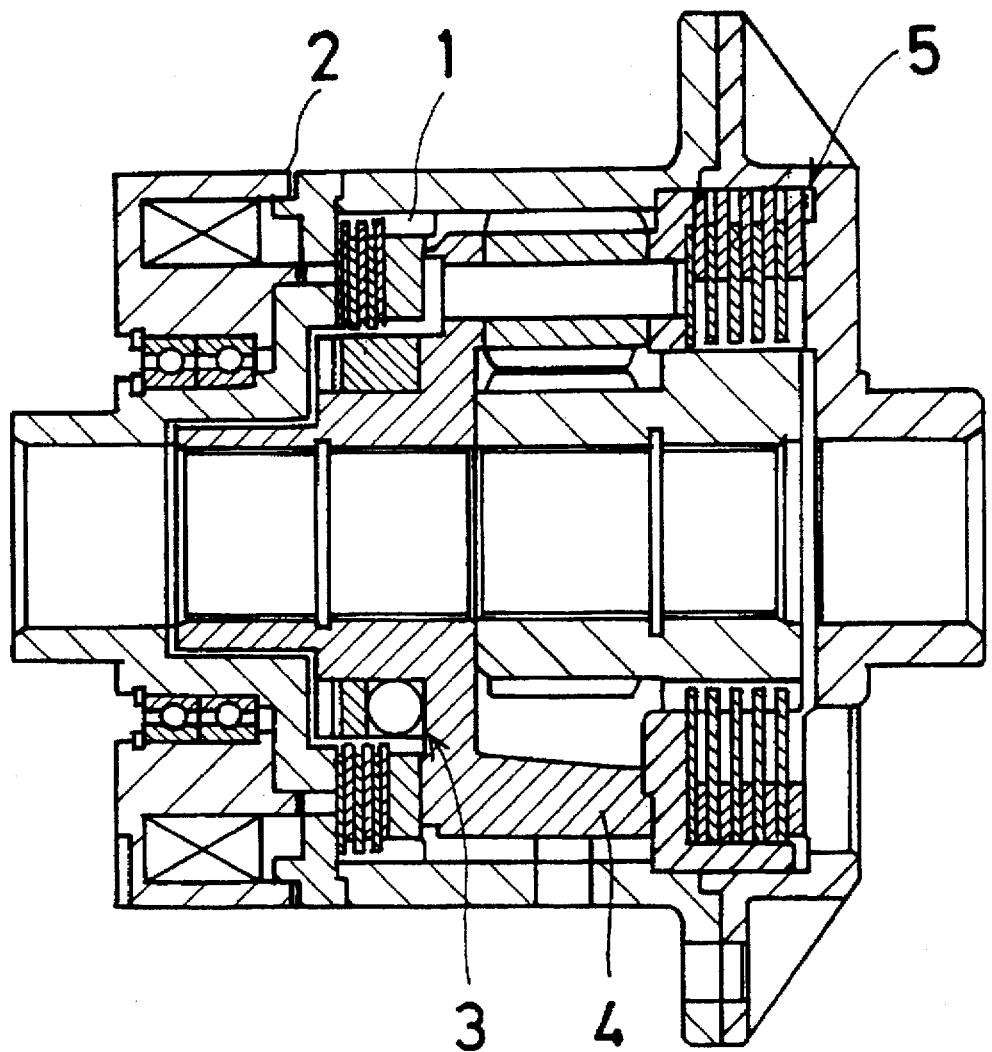
FIG. 9 is a cross-sectional view of a prior coupling device.

FIG. 8 shows a coupling device 600 of the sixth embodiment of this invention. In FIG. 8, the parts which correspond to those depicted in FIG. 5 are identified by the same reference numbers. In the sixth embodiment, the coupling device 600 does not include the coil spring 18 of the third embodiment. In addition, the pressing portion 634 is formed as a single unitary body as opposed to the second moving portion 17b and the pressing portion 14 used in the earlier embodiments. Further, there is no elastic member between the pressing portion 634 and the clutch mechanism 13. Accordingly, the attracting force of the solenoid coil 15 is directly transmitted to the clutch mechanism as a pressing force.

In this embodiment, since the pressing member 634 is directly imparted with the attracting force of the solenoid coil 15, it is possible to reduce the number of parts of the coupling device 600.

In the above mentioned embodiments, although the cam means is applied as a transforming means of the present invention, it is possible to use, for example, helical splines as a transforming means.

Further, in the above mentioned embodiments, the present invention is applied to a coupling device which is disposed between a propeller-shaft and a rear differential gear device of a four wheel drive vehicle. However, it is possible to apply the present invention to, for example, a limited slip differential gear device.

As mentioned above, according to the present invention, the clutch mechanism is connected by an engaging force due to the transforming means and this engaging force is larger than the engaging force associated with an actuator. Therefore it is possible to miniaturize the actuator. Further, it is possible to obtain a desired engaging force by one clutch mechanism and therefore it is possible to miniaturize the coupling device. Thus, it is possible to overcome drawbacks of other known coupling devices.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A coupling device comprising:
an input member;

an output shaft coaxially disposed with respect to said input member;

a clutch mechanism that includes a plate operatively associated with said input member and a disc operatively associated with said output shaft, said clutch mechanism transmitting rotational torque of said input member by frictional engagement between said plate and said disc;

a disc supporting member disposed between said clutch mechanism and said output shaft, said disc supporting member supporting said disc;

an actuator for engaging said plate and said disc with an engaging force; and means different from said actuator for moving said disc supporting member during operation of said actuator to increase the engaging force between said disc and said plate when the rotational speed of said disc supporting member differs from the rotational speed of said output shaft.

2. A coupling device as set forth in claim 1, wherein said means for moving said disc supporting member includes:

a cam ring rotatable with said output shaft;

a wedge space formed between said cam ring and said disc supporting member and having an axial width which gradually decreases from a center portion of the wedge space toward a circumferential end portion of the wedge space; and a ball member disposed in said wedge space.

3. A coupling device as set forth in claim 2, wherein said disc supporting member and said cam ring oppose one another with the disc supporting member being moved by the ball member to engage said disc with said plate when the disc supporting member is rotated relative to said cam ring.

4. A coupling device as set forth in claim 1, wherein said actuator includes an electromagnetic coil.

5. A coupling device as set forth in claim 1, wherein said disc supporting member comprises a first disc supporting member and a separate second disc supporting member.

6. A coupling device as set forth in claim 5, including a spring interposed between the first and second spring supporting members.

7. A coupling device as set forth in claim 1, wherein said actuator includes an electromagnetic coil, a first movable member urged toward the electromagnetic coil upon supply of electric current to the electromagnetic coil and a pressing member operatively connected to the first movable member for moving with the first movable member.

8. A coupling device as set forth in claim 7, including a second movable member separate from the first movable member and disposed between the first movable member and the pressing member, said second movable member encircling the output shaft.

9. A coupling device as set forth in claim 8, including a coil spring disposed between the pressing member and the second movable member.

10. A coupling device as set forth in claim 7, including a spring disposed between the pressing member and the clutch mechanism.

11. A coupling device for use in a differential gear device, comprising:

an input member;

an output member coaxially disposed with respect to said input member;

a clutch mechanism interposed between the input member and the output member, said clutch mechanism including a plurality of plates operative member disposed between said clutch mechanism and said output member, said disc supporting member supporting said discs;

an actuator operatively associated with said clutch mechanism for effecting frictional engagement between said plates and said discs; and a cam mechanism different from said actuator and disposed between the clutch mechanism and the output member for moving said disc supporting member during operation of the actuator to increase an engaging force between said discs and said plates when the rotational speed of said input member differs from the rotational speed of said output member.

12. A coupling device as set forth in claim 11, wherein said cam mechanism includes said disc supporting member and a cam ring operatively connected to the output shaft, at least one of said disc supporting member and said cam ring being provided with at least one groove having a varying depth.

13. A coupling device as set forth in claim 12, wherein said cam mechanism includes a ball positioned in the groove.

14. A coupling device as set forth in claim 13, wherein both said disc supporting member and said cam ring include a plurality of grooves which oppose one another to define a wedge space in each of which is located a ball.

15. A coupling device as set forth in claim 12, wherein said disc supporting member comprises a first disc supporting member and a separate second disc supporting member.

16. A coupling device as set forth in claim 11, wherein said actuator includes an electromagnetic coil, a first movable member urged toward the electromagnetic coil upon supply of electric current to the electromagnetic coil and a pressing member operatively connected to the first movable member for moving with the first movable member.

17. A coupling device as set forth in claim 16, including a second movable member separate from the first movable member and disposed between the first movable member and the pressing member, said second movable member encircling the output shaft.

18. A coupling device as set forth in claim 17, including a spring disposed between the pressing member and the clutch mechanism.

* * * * *